(12) United States Patent
Kurita et al.

(10) Patent No.: US 7,619,857 B2
(45) Date of Patent: Nov. 17, 2009

(54) SILICON-MADE MAGNETIC HEAD SLIDER AND METHOD OF PRODUCING THE SAME

(75) Inventors: Masayuki Kurita, Ibaraki (JP); Toshiya Shiramatsu, Ibaraki (JP); Kimitoshi Etoh, Kanagawa (JP); Takanori Yamazaki, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 696 days.

(21) Appl. No.: 11/373,035

(22) Filed: Mar. 10, 2006

(65) Prior Publication Data

US 2006/0209464 A1    Sep. 21, 2006

(30) Foreign Application Priority Data

Mar. 15, 2005   (JP) .............................. 2005-072403

(51) Int. Cl.
*G11B 5/60*       (2006.01)
(52) U.S. Cl. .................................................. 360/235.3
(58) Field of Classification Search ........................ None
See application file for complete search history.

(56) References Cited

U.S. PATENT DOCUMENTS

| | | | | |
|---|---|---|---|---|
| 6,731,464 B2 * | 5/2004 | Sasaki et al. | ............. | 360/236.3 |
| 6,775,103 B2 * | 8/2004 | Kang et al. | ............. | 360/236.5 |
| 6,920,016 B2 * | 7/2005 | Yamakura et al. | ........ | 360/235.7 |
| 6,920,020 B2 * | 7/2005 | Yamanaka et al. | .......... | 360/317 |
| 7,133,254 B2 * | 11/2006 | Hamann et al. | ........ | 360/125.74 |
| 7,154,696 B2 * | 12/2006 | Nikitin et al. | .................. | 360/75 |
| 7,184,246 B2 * | 2/2007 | Sasaki et al. | ............. | 360/294.7 |
| 7,187,521 B2 * | 3/2007 | Yamanaka et al. | ........... | 360/128 |
| 7,199,982 B2 * | 4/2007 | Suk | .......... | 360/294.7 |
| 7,212,380 B2 * | 5/2007 | Hsiao et al. | ............ | 360/125.12 |
| 7,230,799 B2 * | 6/2007 | Lille | ........................ | 360/294.3 |
| 2002/0141113 A1 * | 10/2002 | Kang et al. | ............. | 360/236.5 |
| 2002/0191326 A1 * | 12/2002 | Xu et al. | ........................ | 360/75 |
| 2003/0035237 A1 * | 2/2003 | Lille | ........................ | 360/77.07 |
| 2003/0140481 A1 * | 7/2003 | Sasaki et al. | ............. | 29/603.07 |
| 2006/0023367 A1 * | 2/2006 | Suk | ............................. | 360/323 |

\* cited by examiner

*Primary Examiner*—Mark Blouin
(74) *Attorney, Agent, or Firm*—Townsend and Townsend and Crew LLP; Rambod Nader (57) ABSTRACT

Embodiments of the invention provide a magnetic disk device which lowers the cost, maintains reliability by compensating the thermal dent or protuberance caused by a change in the environmental temperature, makes it possible to increase the recording density by decreasing the floating amount of the slider, to increase the capacity of the device or to decrease the size thereof. In one embodiment, a magnetic disk device comprises a magnetic disk, a magnetic head slider, and a drive unit for moving the magnetic head slider, wherein an air stream is generated between the magnetic disk that rotates and the magnetic head slider to effect the recording or the reproduction in a state where the magnetic head slider is floating. The magnetic head slider includes a slider substrate portion and a thin-film head portion that has recording and reproducing elements, a metal film, and an insulating film formed on the slider substrate portion and constituting a slider-floating plane along with the slider substrate portion. The slider substrate portion includes a silicon substrate with a recessed portion, and a metal member buried in the recessed portion.

18 Claims, 6 Drawing Sheets

SILICON-MADE MAGNETIC HEAD SLIDER AND METHOD OF PRODUCING THE SAME

CROSS-REFERENCES TO RELATED APPLICATIONS

This application claims priority from Japanese Patent Application No. JP2005-072403, filed Mar. 15, 2005, the entire disclosure of which is incorporated herein by reference.

BACKGROUND OF THE INVENTION

This invention relates to a magnetic disk device, a magnetic head slider and a method of producing the same. More specifically, the invention relates to a magnetic head slider in which a thin-film head portion is formed on a silicon substrate portion, and a magnetic disk device using the magnetic head slider. The expression of recording/reproduction in the following description includes the recording only, reproduction only and both the recording and the reproduction.

In a magnetic disk device, a magnetic head slider mounting a recording/reproducing element floats on the magnetic disk due to the pneumatic wedge film effect to record/reproduce the magnetic data recorded in the magnetic disk. To realize a high recording density of the magnetic disk device and an accompanying large capacity of the device or a decrease in the size, it is essential to decrease the distance (slider's flying height) between the magnetic head slider and the magnetic disk and to increase the linear recording density. In recent years, the flying height has been decreased to be about 10 nm or not larger than 10 nm.

A magnetic head slider generally employed in the conventional magnetic disk devices is constituted by a slider substrate portion and constituting formed on the slider substrate and an air-bearing surface along with the slider substrate.

The above conventional and generally employed magnetic head sliders are produced in a manner of laminating a metal film, a ceramic insulating film and a resin film etc. relying on a thin-film process on a wafer of a mixed sintered body of alumina and titanium carbide (often noted as AlTiC), forming recording/reproducing elements thereby to form a plurality of magnetic head slider portions and, finally cutting the individual magnetic head sliders from the wafer by machining without, however, being able to avoid low productivity.

Therefore, there has been devised a magnetic head slider using silicon as a material of the slider substrate portion instead of using AlTiC as disclosed in a non-patent document 1 (IEEE Transactions on Magnetics, Vol. 40, No. 1, pp. 332-336, Flying-height adjustment technologies of magnetic head sliders). The object of using silicon as a material of the slider substrate portion is to decrease the cost by forming the outer shape of the slider by cutting the slider substrate relying upon etching instead of upon machining.

In the conventional generally employed magnetic head slider comprising the slider substrate portion made of AlTiC and the thin-film head portion having a metal film and a ceramic insulating film, however, it was learned that if the material forming the slider substrate portion is changed from AlTiC into silicon, then, the thin-film head portion is thermally dented or protruded due to a change in the environmental temperature and the reliability decreases though it brings about an advantage such as a decreased machining cost. The thermal dent or protrusion caused by a change in the environmental temperature stems from that the coefficient of linear expansion of the metal film greatly differs relative to the slider substrate portion or the ceramic insulating film, and a slider-floating plane (also called air-bearing surface) that is supposed to have been smoothly finished becomes finely dented or protruded when the temperature is low or high.

The coefficient of linear expansion of the metal film is generally greater than that of the slider substrate portion or of the ceramic insulating film and, hence, the slider-floating plane that is supposed to have been smoothly finished tends to become protruded when the temperature is high. Therefore, a distance (slider floating amount) between the magnetic head slider and the magnetic disk becomes smaller than a designed value, and the magnetic head slider becomes probable to come in contact with the magnetic disk. If the magnetic head slider and the magnetic disk come in contact with each other, it becomes impossible to record/reproduce the magnetic data being affected by vibration due to friction, and the recording/reproducing element tends to be worn out and damaged. In order to avoid the contact even at high temperatures, the floating amount must be designed to be sufficiently large, making it, however, difficult to improve the recording/reproducing performance. At low temperatures, on the other hand, the metal film forming the recording/reproducing element tends to be dented from the floating plane, whereby the distance between the recording/reproducing element and the magnetic disk becomes greater than the designed value to deteriorate the recording/reproducing performance.

The thermal dent or protuberance due to a change in the environmental temperature had been taking place even in the conventional generally employed magnetic head slider constituted by a slider substrate portion made of AlTiC and a ceramic insulating film formed chiefly by alumina. However, if the material forming the slider substrate portion is changed from AlTiC into silicon and if the material forming the ceramic insulating film is changed from alumina into silicon-based ceramics such as silica, silicon carbide or silicon nitride, then, the thermal dent or protuberance further increases due to a change in the environmental temperature. The reason will be described below with reference to Table 1. Table 1 shows the materials of the chief constituent elements and coefficients of linear expansion thereof of a conventional generally employed magnetic head slider and of a magnetic head slider using a silicon substrate of Comparative Example.

TABLE 1

| | Conventional general mag. head slider | Mag. head slider using Si substrate |
|---|---|---|
| Chief metal film material (coefficient of linear expansion) | ferronickel (13 ppm/K) | ferronickel (13 ppm/K) |
| Substrate material (coefficient of linear expansion) | AlTiC (about 7 ppm/K) | silicon (about 3 ppm/K) |
| Chief ceramic insulating film material (coefficient of linear expansion) | alumina (about 7 ppm/K) | Silicon-based ceramics (about 3 ppm/K) |
| Difference in the coefficient of linear expansion between metal film/substrate or between metal film/insulating film | 6 ppm/K | 10 ppm/K |

As shown in Table 1, a metal film of an alloy of chiefly nickel and iron used for the recording/reproducing element has a coefficient of linear expansion of about 13 ppm/K (13/1,000,000 per a degree of temperature), AlTiC and alumina have a coefficient of linear expansion of about 7 ppm/K, and silicon and silicon-type ceramics have a coefficient of linear expansion of about 3 ppm/K. Thermal dent or protuberance at high temperatures or at low temperatures occurs due to a difference in the coefficient. In the conventional generally used magnetic head slider, a difference in the coefficient is about 6 ppm/K while in the magnetic head slider using the silicon substrate of Comparative Example, a difference in the coefficient is about 10 ppm/K which is about five-thirds as great. That is, though the magnetic head slider using the silicon substrate has several advantages, it also is accompanied by a problem in that the thermal dent or protuberance due to a change in the environmental temperature becomes greater than that of the conventional general magnetic head slider.

It is a feature of the present invention to provide a magnetic disk device which helps increase the productivity of the magnetic head sliders while lowering the cost, maintains reliability by compensating for the thermal dent or protuberance caused by a change in the environmental temperature, and makes it possible to increase the recording density by decreasing the floating amount of the slider, to increase the capacity of the device or to decrease the size thereof, a magnetic head slider and a method of producing the same.

BRIEF SUMMARY OF THE INVENTION

According to a first embodiment of the present invention, a magnetic disk device comprises a magnetic disk disposed to freely rotate; a magnetic head slider disposed so as to be opposed to the surface of the magnetic disk; and a drive unit for moving the magnetic head slider in the radial direction of the surface of the magnetic disk. An air stream is generated between the magnetic disk that rotates and the magnetic head slider to effect the recording or the reproduction in a state where the magnetic head slider is floating; the magnetic head slider including a slider substrate portion and a thin-film head portion that has a recording element or a reproducing element as well as metal films (such as magnetic shields of the reproducing element or magnetic poles of the recording element) and an insulating film formed on the slider substrate portion, and is constituting a slider-floating plane along with the slider substrate portion; and the slider substrate portion including a silicon substrate with a recessed portion in the surface on the side of the thin-film head portion, and a metal member buried in the recessed portion.

Described below are more concrete constitutions in the first embodiment of the present invention.

(1) The recording element or the reproducing element is provided on the side of the air flow-out end over the slider substrate portion, and the metal member is provided on the side of the air flow-in end under the thin-film head portion.

(2) The metal member is so provided that the center thereof is positioned on the side of the slider-floating plane beyond the center of the silicon substrate in the direction of the floating height of the slider.

(3) The metal member is embedded in the silicon substrate without being exposed on the slider-floating plane.

(4) The silicon-type ceramic material is used as the insulating film, and the metal member is made of a material having a coefficient of thermal expansion nearly the same as that of the material of the metal film.

(5) In (4) above, the material of the metal member is made of an alloy of nickel and iron, or an alloy of nickel and iron as chief components and containing cobalt, tantalum and the like in small amounts.

(6) The metal member has a size in the direction of the floating height of the slider nearly equal to the size in the same direction of the magnetic shield of the reproducing element or to the size in the same direction of the magnetic pole of the recording element.

(7) The magnetic head slider has three or more pneumatic bearing planes substantially in parallel, the pneumatic bearing planes being constituted by a first plane which is brought closest to the magnetic disk during the operation and on which the recording and reproducing elements are provided, and two or more kinds of planes having two or more kinds of predetermined depths from the first plane, and the size of the metal member in the width direction of the slider is equal to, or greater than, the size in the same direction of a portion constituted by the slider substrate portion on the first plane.

(8) The magnetic head slider has three or more pneumatic bearing planes substantially in parallel, the pneumatic bearing planes being constituted by a first plane which is brought closest to the magnetic disk during the operation and on which the recording and reproducing elements are provided, and two or more kinds of planes having two or more kinds of predetermined depths from the first plane, and the size of the metal member in the longitudinal direction of the slider is equal to, or greater than, the size in the same direction of a portion constituted by the slider substrate portion on the first plane.

A second embodiment of the invention is directed to a magnetic head slider which generates an air stream relative to a magnetic disk that rotates to effect the recording or the reproduction in a state of being floated on the surface of the magnetic disk. The magnetic head slider comprises a slider substrate portion made of silicon, and a thin-film head portion that has a recording element or a reproducing element as well as a metal film and an insulating film formed on the slider substrate portion to constitute a slider floating plane along with the slider substrate portion; wherein the slider substrate portion includes a silicon substrate with a recessed portion in the surface on the side of the thin-film head portion, and a metal member buried in the recessed portion.

A third embodiment of the invention is directed to a method of producing magnetic head sliders which generate an air stream relative to a magnetic disk that rotates to effect the recording or the reproduction in a state of being floated on the surface of the magnetic disk, wherein magnetic head slider portions are formed in a plural number by forming recessed portions in a silicon wafer, burying metal members in the recessed portions, and forming thin-film head portions comprising a recording element or a reproducing element and a metal film and an insulating film on the silicon wafer relying on a thin-film process, and cutting the silicon wafer by etching into the individual magnetic head sliders.

In a more preferred concrete constitution of the third embodiment of the invention, a metal is plated on the recessed potions in the silicon wafer, and the front surface side of the metal plating is polished to form the metal members having surfaces flushed with surface of the silicon wafer.

According to a magnetic disk device, a magnetic head slider and a method of producing the same of the present invention, it is made possible to increase the productivity of the magnetic head sliders while lowering the cost, to maintain reliability by compensating the thermal dent or protuberance caused by a change in the environmental temperature, to increase the recording density by decreasing the floating amount of the slider and to increase the capacity of the device or to decrease the size thereof.

DETAILED DESCRIPTION OF THE INVENTION

An embodiment of the invention will now be described with reference to the drawings.

First, a magnetic disk device, a magnetic head slider and a method of producing the same according to an embodiment of the invention will be described with reference to FIGS. 1 to 6.

Figure 1:
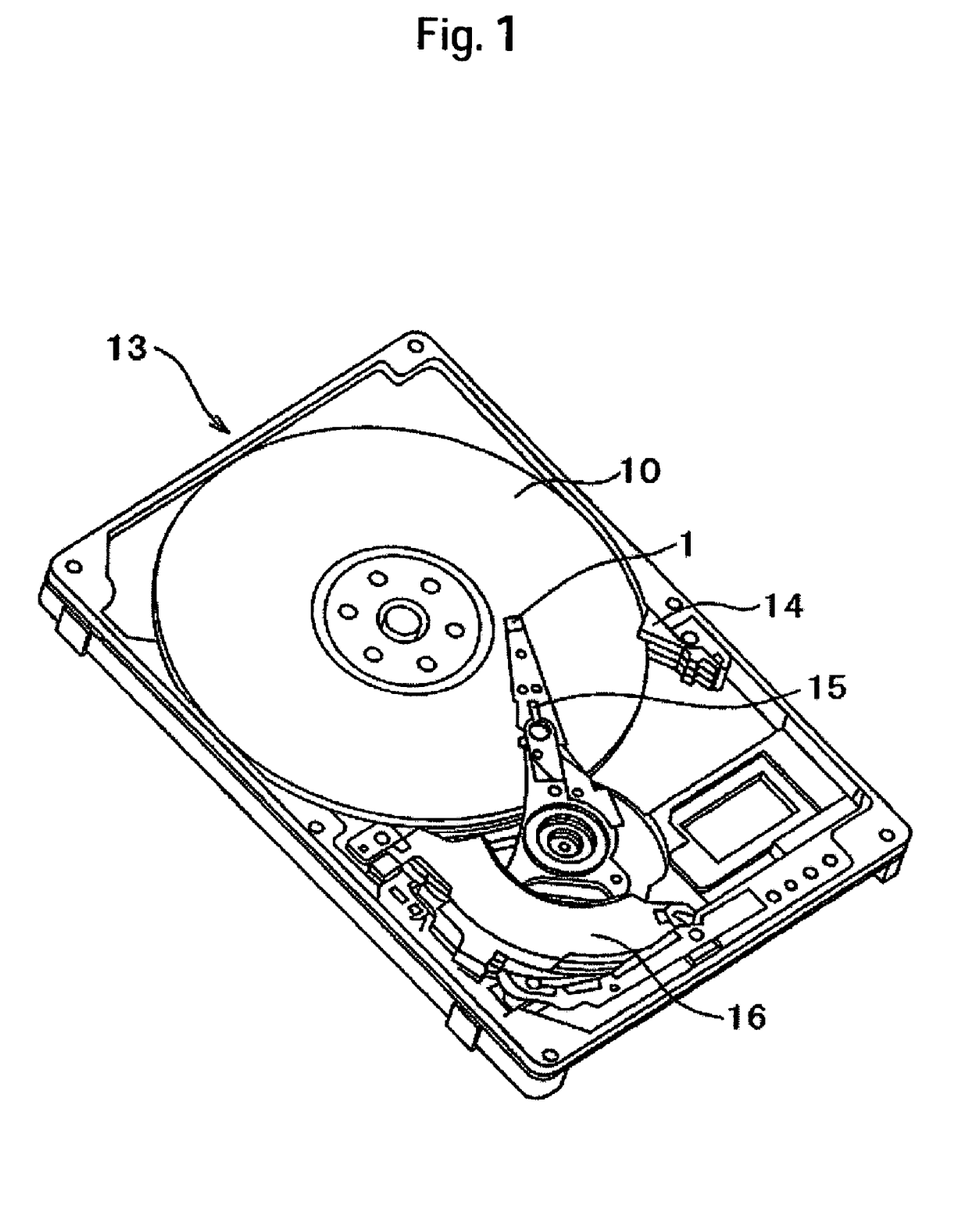
FIG. 1 is a perspective view of a magnetic disk device according to an embodiment of the present invention.

The whole constitution of the magnetic disk device according to the embodiment will be described with reference to FIG. 1 which is a perspective view of the magnetic disk device of this embodiment.

A magnetic disk device 13 is used as a hard disk device mounted on a computer or the like, and comprises a magnetic disk 10 disposed to freely rotate, a magnetic head slider (also simply called slider) 1 disposed so as to be opposed to the surface of the magnetic disk, and a drive unit for moving the magnetic head slider 1 in the radial direction of the surface of the magnetic disk 10. The magnetic disk device 13 generates an air stream between the magnetic disk 10 that rotates and the magnetic head slider 1. Relying upon the wedge effect produced by the air stream, the magnetic head slider 1 floats on the magnetic disk 10 maintaining a very small gap, and the recording and the reproduction are executed in a state where the magnetic disk 10 and the magnetic head slider 1 do not come into direct contact with each other. An increased recording density of the magnetic disk device 13 and an increased capacity of the device stemming from it or a decrease in the size of the device can be effectively accomplished by decreasing the distance between the slider 1 and the magnetic disk 10, i.e., by decreasing the floating amount of the slider and by increasing the linear recording density. In recent years, the floating amount of the slider has been decreased down to about 10 nm or not larger than 10 nm.

The magnetic disk 10 is a disk-like medium for storing magnetic data, mounted on a spindle motor installed in a housing and rotates at a high speed. The magnetic disk 10 is constituted by a hard substrate such as a glass and a magnetic film formed on the hard substrate by thin film-forming techniques such as a vacuum evaporation method.

The magnetic head slider 1 is for recording and reproducing data into, and from, the magnetic disk 10, mounted on an end of a load beam 15 of the shape of a leaf spring that constitutes a portion of the drive unit, and is pushed by the load beam 15 to exert a load onto the surface of the magnetic disk. That is, the magnetic head slider 1 travels on the magnetic disk 10 relative thereto to read out magnetic data recorded in the magnetic disk 10 or to write them into the magnetic disk 10.

The drive unit is constituted by the load beam 15 and a voice coil motor 16. The load beam 15 is supported in a manner to be rotated by the voice coil motor 16. Thus, the magnetic head slider 1 is driven by the voice coil motor 16 via the load beam 5 so as to be moved to any radial position on the magnetic disk 10 to effect the recording or the reproduction on the whole surface of the magnetic disk. When the apparatus is halting or when there is no recording or reproduction instruction for a predetermined period of time, the magnetic head slider 1 turns aside to a ramp 14 positioned on the outer side of the magnetic disk 10, and is maintained in a state of being separated away from the surface of the magnetic disk 10. Though the device described above was equipped with a loading/unloading mechanism, the effect of the invention is similarly obtained even with the magnetic disk device 13 of the contact start/stop system in which the magnetic head slider 1 stands by on a particular region of the magnetic disk 10 when the device is not in operation.

Next, a concrete structure of the above magnetic head slider 1 will be described with reference to FIG. 2 which is a perspective view of the magnetic head slider used for the magnetic disk device 13 of the embodiment.

The magnetic head slider 1 is constituted by a total of six planes, i.e., an air flow-in end plane (leading edge) 11, a slider-floating plane (air-bearing surface), air flow-out end plane (trailing edge) 12, both side planes and a back plane. Here, the slider-floating plane has three or more planes 6 to 8 which are substantially in parallel. These planes 6 to 8 are constituted by a first plane (rail plane) 6 which, during the operation, is brought closest to the magnetic disk and on which the recording and reproducing elements are provided, and two or more kinds of planes (shallow step plane 7 and deep groove plane 8) having two or more kinds of predetermined depths from the rail plane 6. The magnetic head slider 1 is constituted by a slider substrate portion 1a made chiefly of silicon and a thin-film head portion 1b formed on the slider substrate portion 1a by a thin-film process. The magnetic head sliders 1 are obtained by subjecting the wafer to the steps of sputtering, plating and polishing, repetitively, to laminate the thin-film head portion 1b on the slider substrate portion 1a, and cutting out many magnetic head sliders 1 from the wafer by etching. In the conventional AlTiC substrate, the magnetic head sliders had to be cut out from the wafer by machining. According to this embodiment, however, the magnetic head sliders 1 can be cut out from the silicon substrate by etching at a low cost.

The magnetic head slider 1 has a standardized shape of nearly a rectangular parallelepiped shape having, for example, a length of 1.25 mm, a width of 1.0 mm and a thickness of 0.3 mm. The slider-floating plane is smoothly finished by polishing. In addition to the above size, the magnetic head slider 1 may further assume a smaller standardized size of a length of 0.85 mm, a width of 0.7 mm and a thickness of 0.23 mm. The effect of the invention is similarly obtained even with the magnetic head slider of the above small size.

A fine step (step bearing) is formed in the slider-floating plane by such a process as ion milling or etching, and is opposed to the magnetic disk 10 to produce a pneumatic pressure that plays the role of a pneumatic bearing for supporting the load exerted on the back plane. The above-mentioned steps 6 to 8 are formed in the slider-floating plane forming substantially three kinds of planes which are in parallel. Three kinds of the planes include the rail plane 6 closest to the disk, the shallow groove plane (generally representing 7a and 7b) which is a stepped bearing plane deep by about 100 nm to about 200 nm from the rail plane, and a deep groove plane 8 deep by about 1 μm from the rail plane. The air stream produced accompanying the rotation of the magnetic disk 10 enters into the rail plane 6 from the shallow groove plane 7 and is compressed as it flows through a flow passage that is squeezed toward the forward direction, whereby a positive pneumatic pressure is produced. When the air stream flows into the deep groove plane 8 from the rail plane 6 or the shallow groove plane 7, on the other hand, the flow passage expands and a negative pneumatic pressure is produced.

Figure 2:
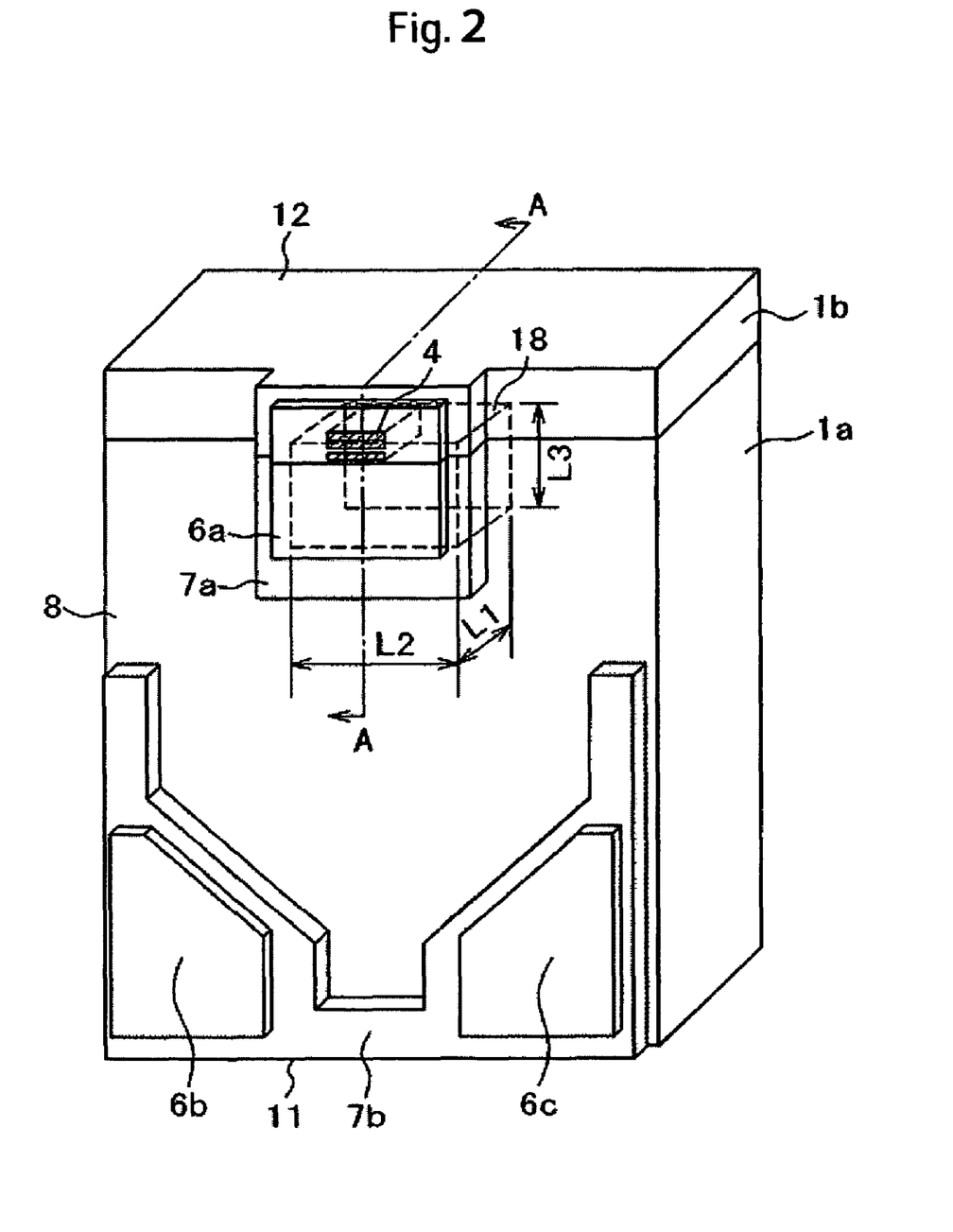
FIG. 2 is a perspective view of a magnetic head slider used for the magnetic disk device of the embodiment.
Figure 3:
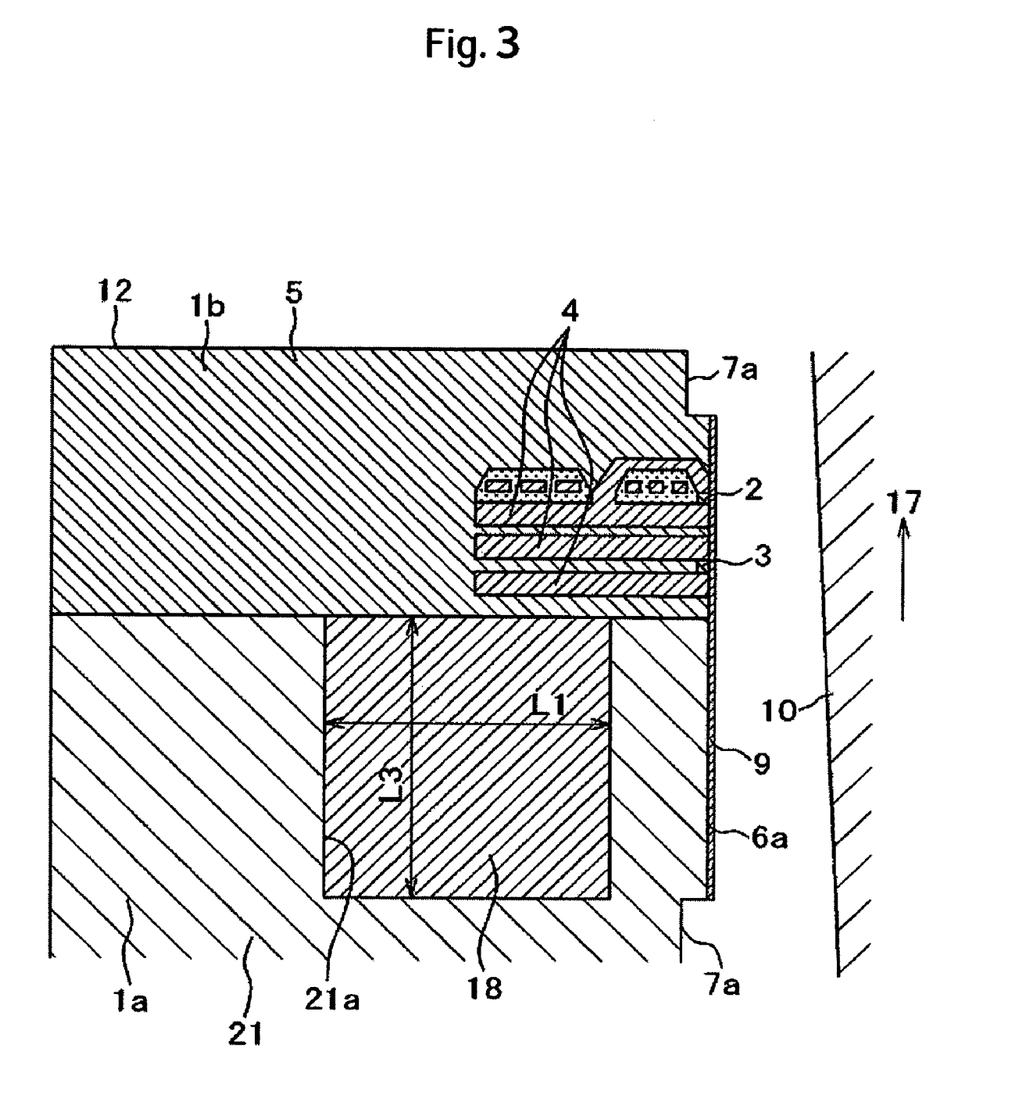
FIG. 3 is a sectional view along the line A-A in FIG. 2.
Figure 4:
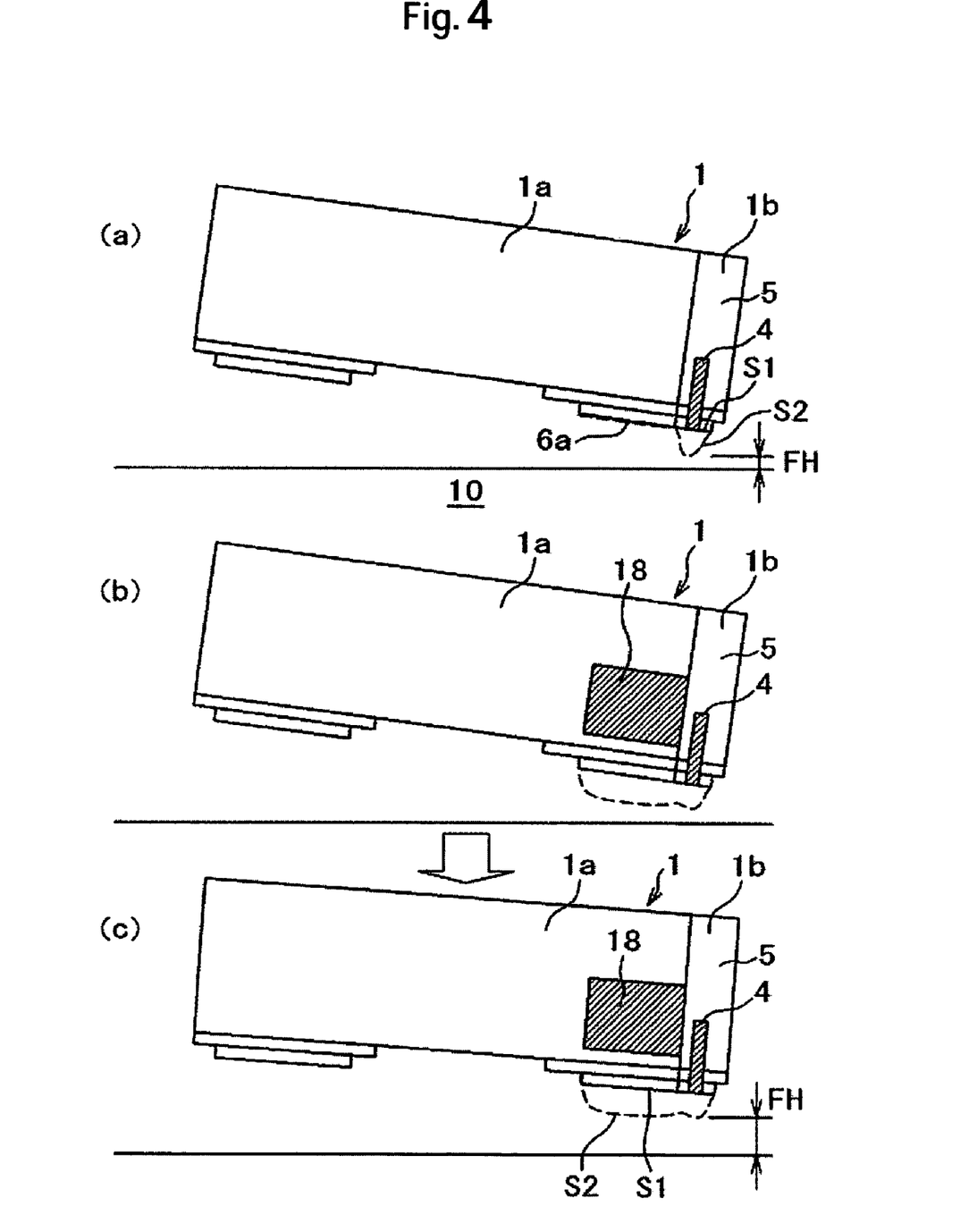
FIG. 4 is a sectional view of a magnetic head slider illustrating the thermal protrusion of the head and the effect of compensation therefor by comparing the conventional structure with the structure of the invention.

The magnetic head slider 1 is so designed as to float in such an attitude that a floating amount on the side of the air flow-in end 11 is greater than a floating amount on the side of the air flow-out end 12 (see FIGS. 3 and 4). Therefore, the floating plane near the air flow-out end 12 approaches closest to the magnetic disk 10. Near the air flow-out end 12, a center pad 6a which is part of the rail plane 6 protrudes beyond the surrounding shallow groove plane 7a and the deep groove plane 8. Therefore, the rail plane 6 approaches closest to the disk unless the slider pitch attitude and the roll attitude are tilted in excess of a predetermined limit. The recording element 2 and the reproducing element 3 are formed in a portion belonging to the thin-film head portion 1b of the rail plane 6a. The shape of the floating surface is so designed that the load pushed by the load beam is well balanced with the positive and negative pneumatic pressures produced on the floating plane, so that a distance from the recording element 2 and the reproducing element 3 to the magnetic disk 10 is maintained to a suitable value of about 10 nm or smaller.

The magnetic head slider 1 in the foregoing, was described as having the floating plane 8 of the two-stepped bearing formed by three kinds of planes 6, 7 and 8 which are substantially in parallel. The same effect of the invention can also be obtained even with the magnetic head slider having the floating plane of a stepped bearing formed by four or more kinds of parallel planes.

Next, described below with reference to FIGS. 2 and 3 is the detailed structure in the vicinity of the recording element 2 and the reproducing element 3. FIG. 3 is a sectional view illustrating a major portion of the magnetic head slider 1 used for the magnetic disk device 13 of the embodiment, and is a cross section along the line A-A of FIG. 2. In FIG. 3, reference numeral 17 denotes the rotational direction of the magnetic disk 10.

The thin-film head portion 1b for recording or reproducing the magnetic data includes an inductive recording element 2 for recording the magnetic data by generating a magnetic field between the magnetic poles relying on an electric current that flows into the coil, and a reluctance-type reproducing element 3 that measures a change in the reluctance due to the magnetic field. Concretely speaking, the thin-film head portion 1b is constituted by metal films 4, a ceramic insulating film 5 and a resin film formed on the silicon substrate 1a by a thin-film process like plating, sputtering and polishing. On the floating plane, there are formed step bearings such as the rail plane 6 (inclusive of a center pad 6a) and the shallow groove plane 7 (7a). On the rail plane 6 (inclusive of the center pad 6a), further, there is formed a carbon protection film 9 of a thickness of several nm to prevent the abrasion even when there occurs a slight contact with the magnetic disk 10 for short periods of time and to prevent the corrosion of the recording element 2 and of the reproducing element 3. There are two kinds of the recording systems; i.e., the one in which the magnetization direction on the magnetic disk 10 is in the longitudinal (in-plane) direction and the one in which the magnetization direction on the magnetic disk 10 is in the vertical direction. Though the structures of the recording element 2 and of the magnetic disk 10 may differ depending upon the systems, the effect of the invention is obtained by either one of these systems.

Prior to forming the thin-film portion 1b in the slider substrate portion 1a, a recessed portion is formed by dry etching in the substrate in the form of the wafer, and a metal member 18 is buried in the recessed portion. The metal member 18 is formed having nearly the same area as the center pad 6a in the slider substrate portion 1a, and is close to the center pad 6a. Further, the metal member 18 is provided close to the metal films 4.

The effect stemming from the provision of the metal member 18 will now be described with reference to FIG. 4 which is a sectional view of the magnetic head slider illustrating the thermal protrusion of the head and the effect of compensation thereof by comparing the conventional structure with the structure of the embodiment. As for the metal films 4, they are illustrated in a shape simpler than that illustrated in FIG. 3. Further, the scales of the floating height and the step are shown in an exaggerated manner as compared to the size of the slider.

In the conventional structure illustrated in FIG. 4(a), the thermal dent and protuberance caused by a change in the environmental temperature greatly affects the floating amount FH of the recording/reproducing element portions. The metal films 4 have a coefficient of linear expansion which is generally larger than that of the slider substrate portion 1a or of the ceramic insulating film 5. Therefore, a smooth floating plane (shape S1) is obtained at normal temperature while a protrusion (shape S2) is formed at high temperatures. What protrudes is only a portion close to the recording and reproducing elements. As a result, the slider-floating amount FH becomes much smaller than the designed value, and a probability of contact increases. When the temperature is low, on the other hand, only the portion close to the recording and reproducing elements is dented from the floating plane, and the floating amount FH becomes much larger than the designed value, and the recording/reproducing performance greatly drops.

In the structure of the embodiment shown in FIG. 4(b), on the other hand, when the temperature is high, not only the portion close to the recording and reproducing elements but also the center pad 6a as a whole protrude due to the presence of the metal member 18. When the center pad 6a as a whole approaches the magnetic disk 10, a greatly increased pneumatic pressure is produced on the center pad 6a, and a balance is lost with the load exerted by the suspension. Balance is further lost concerning the pitch moment about the suspension pivot point. As a result, the floating attitude of the slider as a whole varies (floating amount of the slider as a whole increases) until the load and the pneumatic pressure are balanced and until the pitch moment about the suspension pivot point becomes zero, creating a state of having a slider floating amount FH equal to the design value as shown in FIG. 4(c). When the temperature is low, on the other hand, the center pad 6a as a whole is dented, whereby the pneumatic pressure decreases and the floating attitude of the slider as a whole varies (floating amount of the slider as a whole decreases). As a result, the floating amount of the recording and reproducing elements is almost not affected by the temperature.

Reverting to FIG. 3, the metal member 18 will be further described.

As the material of the metal member 18, there may be used an alloy of nickel and iron, or an alloy of chiefly nickel and iron further containing small amounts of cobalt, tantalum, etc., which is a material resembling the magnetic pole forming part of the recording element 2 or resembling the magnetic shield forming part of the reproducing element 3. The first reason is based on abundant experience related to the film-forming process. The second reason is that the size of the metal member 18 can be easily designed for obtaining the effect shown in FIG. 4 if the modulus of elasticity and the coefficient of thermal expansion which are mechanical properties related to the thermal expansion are nearly equal to the modulus of elasticity and the coefficient of thermal expansion of the metal film 4 that is thermally dented or protruded depending upon a change in the environmental temperature.

As will be obvious from FIG. 3, the recording element 2 and the reproducing element 3 are positioned on a side (on the side of the air flow-out end 12) over the uppermost surface of the slider substrate portion 1a. On the other hand, at least most of the portion of the metal member 18 is positioned on a side (on the side of the air flow-in end 11) under the uppermost surface of the slider substrate portion 1a. FIG. 3 illustrates a case where the recessed portion is filled with the metal plating which is, then, polished so that the upper surface of the metal member 18 is flush with the upper surface of the substrate portion 1a. When the recessed portion is not completely filled with the metal plating but a ceramic film that serves as a base of the thin-film head portion is formed by sputtering and is polished to be flush, the upper surface of the metal member 18 is slightly dented from the upper surface of the slider substrate portion 1a.

Concerning the direction of the floating height (direction same as the size L1 in FIG. 3) shown in FIG. 3, it is desired that the center of the metal member 18 is positioned on the side of the floating plane above the center of the slider substrate portion 1a. When the center of the metal member 18 is nearly in agreement with the center of the slider substrate portion 1a or when the center of the metal member 18 is positioned away from the floating plane, the effect of the invention becomes relatively small. To obtain the effect same as that of when the center is positioned on the side of the floating plane, therefore, the size L1 must be increased in the direction of the floating height of the metal member 18.

Referring to FIG. 3, it is desired that the metal member 18 is not exposed on the floating plane. A first reason is to prevent the corrosion of the metal member 18. A second reason is that a material exposed on the floating plane that is probable to come in contact with the magnetic disk is better limited to silicon, ceramics or a carbon protection film that has heretofore been practically used as a sliding material.

Concerning the metal member 18, it is desired that the size L1 in the direction of the floating height of FIG. 3 is nearly the same as the size in the same direction of the magnetic shield of the reproducing element 3 or is nearly the same as the size in the same direction of the magnetic pole of the recording element 2. This is because the center pad 6a protrudes nearly uniformly. The effect, however, is obtained in a limited manner even when the size is not the same. That is, the effect of the temperature upon the floating amount of the recording and reproducing element portions can be decreased as compared to that of the conventional structures though it cannot be eliminated.

Concerning the metal member 18, it is desired that the size L2 in the width direction of the slider (radial direction of the disk) of FIG. 3 is the same as, or larger than, the size in the same direction of the center pad 6a. This is because the center pad 6a protrudes nearly uniformly. The effect, however, is obtained in a limited manner even when the size L2 is smaller than the size in the same direction of the center pad 6a. That is, the effect of the temperature upon the floating amount of the recording and reproducing element portions can be decreased as compared to that of the conventional structures though it cannot be eliminated.

Concerning the metal member 18, it is desired that the size L3 in the longitudinal direction of the slider (size in the circumferential direction of the disk) of FIG. 3 is the same as, or is larger than, the size in the same direction of the center pad 6a of the slider substrate portion 1a. This is because the center pad 6a protrudes nearly uniformly. The effect, however, is obtained in a limited manner even when the size L3 is smaller than the size in the same direction of the substrate portion of the center pad 6a. That is, the effect of the temperature upon the floating amount of the recording and reproducing element portions can be decreased as compared to that of the conventional structures though it cannot be eliminated.

Figure 5:
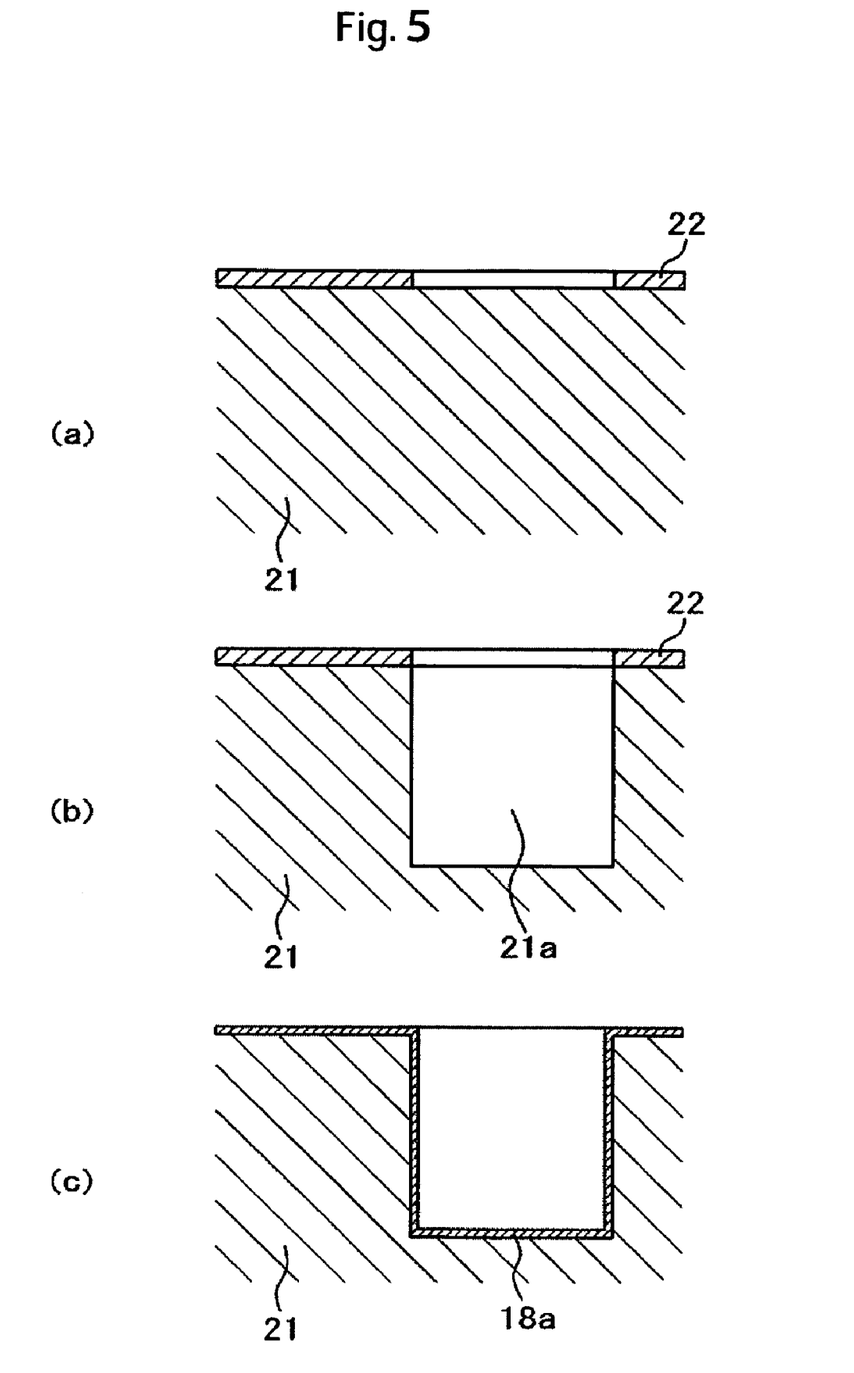
FIG. 5 is a sectional view of steps illustrating a method of producing a magnetic head slider used for a magnetic disk device of the embodiment.
Figure 6:
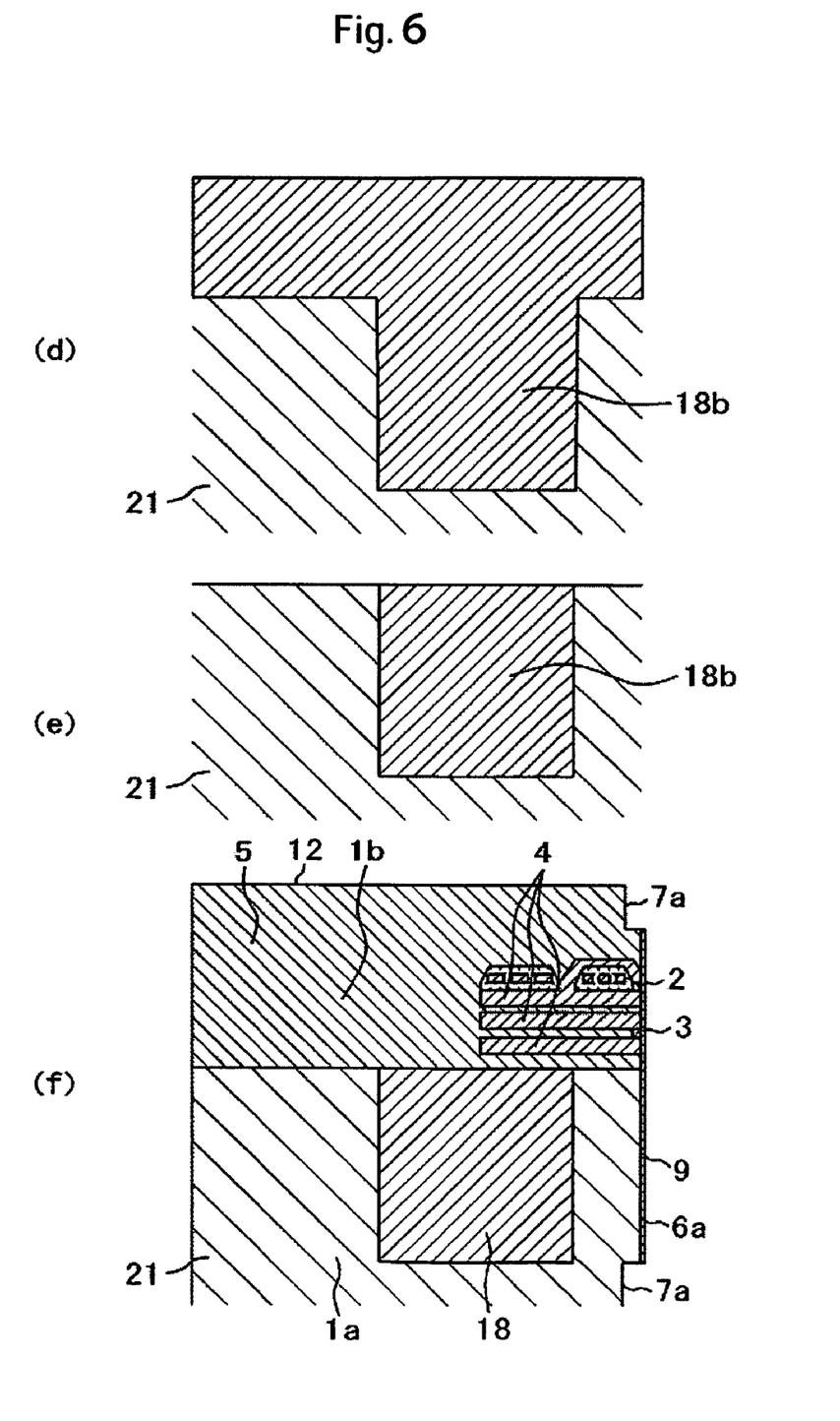
FIG. 6 is a sectional view of steps that follow FIG. 5.

A method of producing the magnetic head slider 1 will be described next with reference to FIGS. 5 and 6. FIG. 5 is a sectional view illustrating major portions of the steps of producing the magnetic head slider 1 used for the magnetic disk device 13 of the embodiment, and FIG. 6 is a sectional view illustrating major portions that follow the production steps of FIG. 5.

Referring, first, to FIG. 5(a), a mask 22 which is a resist film or a thermally oxidized film is formed on the upper surface of the silicon substrate 21. Referring next to FIG. 5(b), a recessed portion 21a is formed having a depth comparable to, or larger than, the size of the center pad 6a of the slider substrate portion 1a by a removing technique such as dry etching. After the mask 22 is removed, a thin underlying metal film 18a such as an alloy of nickel and iron is formed on the surface of the silicon substrate 21 (inclusive of the surface forming the recessed portion 21a) by sputtering and so on. The metallic underlying film 18a becomes an underlying film for plating that will be described below.

Referring next to FIG. 6(d), there is plated a metal plated film 18b of a metal material same as the underlying metal film 18a. Next, referring to FIG. 6(e), the polishing is conducted such that the upper surfaces are in flush between the slider substrate 21 and the metal plated film 18b. Next, there are effected an ordinary thin film head-forming process, a slider-cutting process and a floating plane-forming process to finish the magnetic head slider 1 of the embodiment illustrated in FIG. 6(f).

The effect of the invention is similarly obtained even when the ceramic insulating film 5 has a structure in which it is partly divided into two or more kinds of ceramic materials in addition to the case when the ceramic insulating film 5 is made of a single kind of the material.

According to this embodiment, use of the slider substrate portion made of silicon renders it possible to improve the productivity of the magnetic head sliders, to lower the cost, to minimize the effect of a change in the environmental temperature upon the floating amount of the recording and reproducing element portions, and to maintain reliability by preventing the contact between the magnetic head slider and the magnetic disk. It is, therefore, made possible to float the magnetic head slider in small amounts to increase the recording density, to increase the capacity of the device or to decrease the size of the device.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk device comprising:
   a magnetic disk disposed to rotate;
   a magnetic head slider disposed so as to be opposed to a surface of the magnetic disk; and
   a drive unit configured to move the magnetic head slider in a radial direction of the surface of the magnetic disk;
   wherein an air stream is generated between said magnetic disk that rotates and said magnetic head slider to effect recording or reproduction in a state where said magnetic head slider is floating;

wherein said magnetic head slider includes a slider substrate portion and a thin-film head portion that has a metal film recording element or a metal film reproducing element and an insulating film formed on the slider substrate portion and constituting an air-bearing surface along with the slider substrate portion; and wherein the slider substrate portion includes a silicon substrate with a recessed portion in the surface on the side of the thin-film head portion, and a metal member buried in the recessed portion, the metal member disposed on a side of an air flow in end relative to the thin-film head portion and separate from the thin-film head portion.

2. A magnetic disk device according to claim 1, wherein said metal member is so provided that a center thereof is positioned on the side of the air-bearing surface beyond a center of said silicon substrate in the direction of the flying height of the slider.

3. A magnetic disk device according to claim 1, wherein said metal member is embedded in said silicon substrate without being exposed on the air-bearing surface.

4. A magnetic disk device according to claim 1, wherein a silicon-type ceramic material is used as said insulating film, and said metal member is made of a material having a coefficient of thermal expansion nearly the same as the coefficient of thermal expansion of the material of said metal film.

5. A magnetic disk device according to claim 4, wherein said metal member is made of an alloy of nickel and iron, or an alloy of nickel and iron as chief components and containing cobalt; tantalum and the like in small amounts.

6. A magnetic disk device according to claim 1, wherein said metal member has a size in a direction of the flying height of the slider nearly equal to the size in said direction of the magnetic shield of said reproducing element or to the size in said direction of the magnetic pole of said recording element.

7. A magnetic disk device according to claim 1,
wherein said air-bearing surface of said magnetic head slider is constituted by three or more planes substantially in parallel, a first plane which is brought closest to the magnetic disk during the operation and on which the recording and reproducing elements are provided, and two or more kinds of planes having two or more kinds of predetermined depths from said first plane; and wherein the size of said metal member in the width direction of the slider is equal to, or greater than, the size in said direction of a portion constituted by said slider substrate portion on said first plane.

8. A magnetic disk device according to claim 1, wherein said air-bearing surface of said magnetic head slider is constituted by three or more planes substantially in parallel, a first plane which is brought closest to the magnetic disk during the operation and on which the recording and reproducing elements are provided, and two or more kinds of planes having two or more kinds of predetermined depths from said first plane;

and the size of said metal member in the longitudinal direction of the slider is equal to, or greater than, the size in said direction of a portion constituted by said slider substrate portion on said first plane.

9. A magnetic head slider which generates an air stream relative to a magnetic disk that rotates to effect recording or reproduction in a state of being floated on a surface of the magnetic disk, said magnetic head slider comprising:

a slider substrate portion made of silicon, and a thin-film head portion that has a metal film recording element or a metal film reproducing element and an insulating film formed on the slider substrate portion to constitute an air-bearing surface along with the slider substrate portion; wherein, the slider substrate portion includes a silicon substrate with a recessed portion in the surface on the side of the thin-film head portion, and a metal member buried in the recessed portion, the metal member disposed on a side of an air flow in end relative to the thin-film head portion and separate from the thin-film head portion.

10. A method of producing magnetic head sliders which generate an air stream relative to a magnetic disk that rotates to effect recording or reproduction in a state of being floated on the surface of the magnetic disk, wherein magnetic head slider portions are formed in a plural number by forming recessed portions in a silicon wafer, burying metal members in the recessed portions, and forming thin-film head portions comprising a recording element or a reproducing element and a metal film and an insulating film on said silicon wafer using a thin-film process, and cutting said silicon wafer by etching into the individual magnetic head sliders, the metal member disposed on a side of air flow in end relative to the thin-film head and portion and separate from the thin-film head portion.

11. A method of producing magnetic head sliders according to claim 10, wherein a metal is plated on the recessed potions in said silicon wafer, and a front surface side of the metal plating is polished to form said metal members having surfaces in flush with surface of said silicon wafer.

12. A method of producing magnetic head sliders according to claim 10, wherein said metal member is so provided that a center thereof is positioned on the side of the air-bearing surface beyond a center of said silicon substrate in the direction of the flying height of the slider.

13. A method of producing magnetic head sliders according to claim 10, wherein said metal member is embedded in said silicon substrate without being exposed on the air-bearing surface.

14. A method of producing magnetic head sliders according to claim 10, wherein a silicon-type ceramic material is used as said insulating film, and said metal member is made of a material having a coefficient of thermal expansion nearly the same as the coefficient of thermal expansion of the material of said metal film.

15. A method of producing magnetic head sliders according to claim 14, wherein said metal member is made of an alloy of nickel and iron, or an alloy of nickel and iron as chief components and containing cobalt, tantalum and the like in small amounts.

16. A method of producing magnetic head sliders according to claim 10, wherein said metal member has a size in a direction of the flying height of the slider nearly equal to the size in said direction of the magnetic shield of said reproducing element or to the size in said direction of the magnetic pole of said recording element.

17. A method of producing magnetic head sliders according to claim 10, wherein said air-bearing surface of said magnetic head slider is constituted by three or more planes substantially in parallel, a first plane which is brought closest to the magnetic disk during the operation and on which the recording and reproducing elements are provided, and two or more kinds of planes having two or more kinds of predetermined depths from said first plane; and wherein the size of said metal member in the width direction of the slider is equal to, or greater than, the size in said direction of a portion constituted by said slider substrate portion on said first plane.

18. A method of producing magnetic head sliders according to claim 10, wherein said air-bearing surface of said magnetic head slider is constituted by three or more planes substantially in parallel, a first plane which is brought closest to the magnetic disk during the operation and on which the recording and reproducing elements are provided, and two or more kinds of planes having two or more kinds of predetermined depths from said first plane; and wherein the size of said metal member in the longitudinal direction of the slider is equal to, or greater than, the size in said direction of a portion constituted by said slider substrate portion on said first plane.

* * * * *